INVENTOR.
JEAN-PIERRE A. PUGNAIRE
BY
*Blair Buckles Cesari*
ATTORNEYS

INVENTOR.
JEAN-PIERRE A. PUGNAIRE

United States Patent Office 3,413,845
Patented Dec. 3, 1968

3,413,845
LOW DEFLECTION FORCE TRANSDUCER
Jean-Pierre A. Pugnaire, Arlington, Mass., assignor, by mesne assignments, to Bytrex, Inc., Waltham, Mass., a corporation of Massachusetts
Filed Feb. 18, 1966, Ser. No. 528,449
19 Claims. (Cl. 73—141)

ABSTRACT OF THE DISCLOSURE

A strain gage load cell utilizes a thin shear plate to measure forces applied to a load-receiving diaphragm. The shear plate is mounted in a structure which spans across a diameter of a tubular wall forming the load cell housing and is connected between the housing and a thrust member extending in an axial direction perpendicular to the diaphragm. Due to this construction, the shear plate receives opposing forces from the housing and the thrust member to generate forces within the plate which are predominantly shearing forces so that a high sensitivity is obtained for a relatively low deflection.

This invention relates to a force-measuring device of the type that converts compression and tension forces being measured to shear strain. The strain is produced in a shear element having strain-sensitive gages that provide an accurate measure of the input force.

More particularly, the invention provides a shear strain force transducer in which the shear element—subjected to shear in the transverse direction—laterally extends between opposed walls of a tubular support member. The tubular member supports the shear element along its lateral edges that are parallel to the walls of the member. With this arrangement, forces being measured are converted to shear in the shear element with comparatively little other stresses being produced in the element. Also, the tubular support member isolates the shear element from many spurious forces that would introduce errors into the output signal.

The transducer is particularly well suited for measuring fluid pressures. For this application, the pressure is exerted against a diaphragm peripherally supported by the tubular support member. The transducer also operates well with a second diaphragm as a sealed load cell that is insensitive to environmental pressure.

The transducer operates with a relatively small deflection of the force-receiving elements, yet it also has high sensitivity. Further, it is linear and has a high natural frequency. It is also relatively insensitive to changes in temperature.

An object of the invention is to provide a force transducer characterized by both high sensitivity and low deflection of the force-receiving elements. A particular object is to provide these features in a pressure transducer. The desirability of attaining both high sensitivity and low deflection in force transducers is well recognized. However, when the stiffness of the transducer is increased to decrease the deflection a force produces, the sensitivity generally decreases by a commensurate amount. One aspect of the present invention is thus directed to providing a force transducer that attains a new low level of deflection combined with a high level of sensitivity.

Another object of the invention is to provide a force transducer that applies a high percentage of the unknown input force to the strain gages producing the electrical output signal. A corollary object is to provide a transducer that applies a uniform percentage of the input force to the strain gages for essentially all levels of input force amplitude.

It is also an object of the invention to provide a force transducer of the above character that has comparatively high linearity.

A further object of the invention is to provide a transducer that exerts substantially only shear on the shear element in response to the input force. When, on the other hand, the shear element is subjected to bending and other spurious stresses due to the input force, errors are introduced into the measurement.

It is also an object of the invention to provide a force transducer of the above character which has a relatively high mechanical resonant frequency.

Still another object of the invention is to provide a pressure transducer whose operation is relatively insensitive to changes in the temperature of the fluid whose pressure is being measured.

A further object of the invention is to provide a force transducer of the above character having a relatively small size.

Also, it is an object to provide a transducer of the above character that can readily constructed for measuring small loads or for measuring large loads.

Another object of the invention is to provide an improved force transducer that is insensitive to environmental pressure. More particularly, it is an object to provide such a pressure insensitive force transducer that operates with small deflection and yet has high sensitivity.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

A pressure transducer embodying the invention receives the fluid pressure with a diaphragm that by itself offers relatively little resistance to deflection. An axially-rigid rod couples a gaged strain element in the form of an on-edge blade to the diaphragm in such a manner that the blade stiffness imparts a high degree of resistance to diaphragm deflection. The rod also concentrates the force exerted over the entire diaphragm to the center of the blade.

The diaphragm spans a rigid tubular collar that is coaxial with the force-transferring rod. The blade is mounted in this coaxial structure diametrically bridging the collar and axially spaced from the diaphragm.

The collar firmly constrains the blade from deflecting sideways, transverse to the direction of the shear stresses in it. It also isolates the blade from practically all forces other than the shear. Hence, the blade has to resist essentially only shear and needs only a minimum of additional structure resistant to other forces. Such additional structure would provide a significant part of the reaction force countering diaphragm deflection, so that only a portion of the force produced by the load would be concentrated where it can be sensed with conventional strain gages. However, being free of the requirement for additional structure in the blade, the present transducer concentrates the reaction forces in the gaged areas and thus it produces essentially a maximum change in output signal possible for a given deflection.

The assembled diaphragm, support collar, force-transferring rod and blade are highly compact, particularly in terms of the high sensitivity of the transducer they provide.

Figure 1:
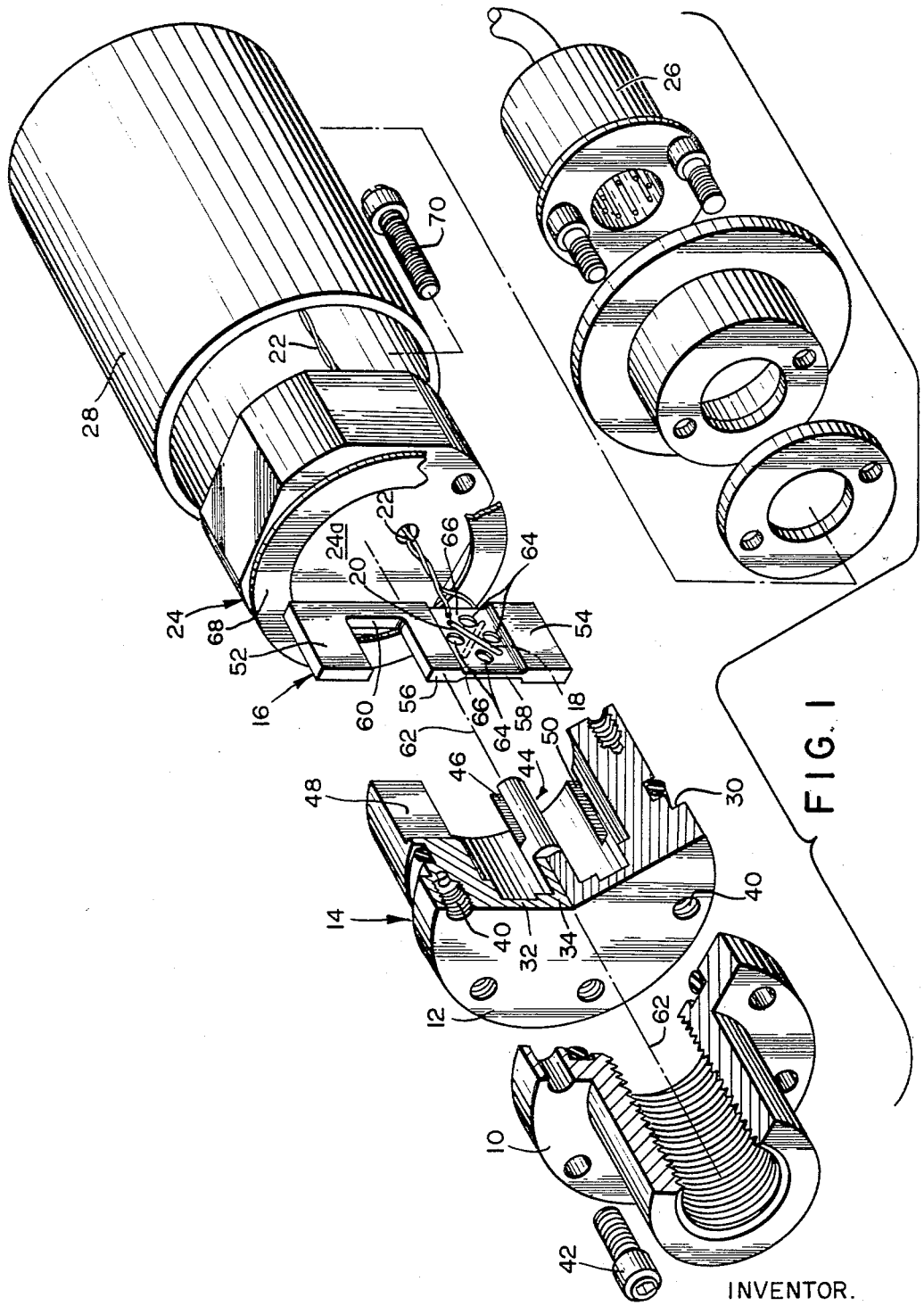
FIGURE 1 is an exploded view, partly broken away, of a pressure transducer embodying the invention.
Figure 2:
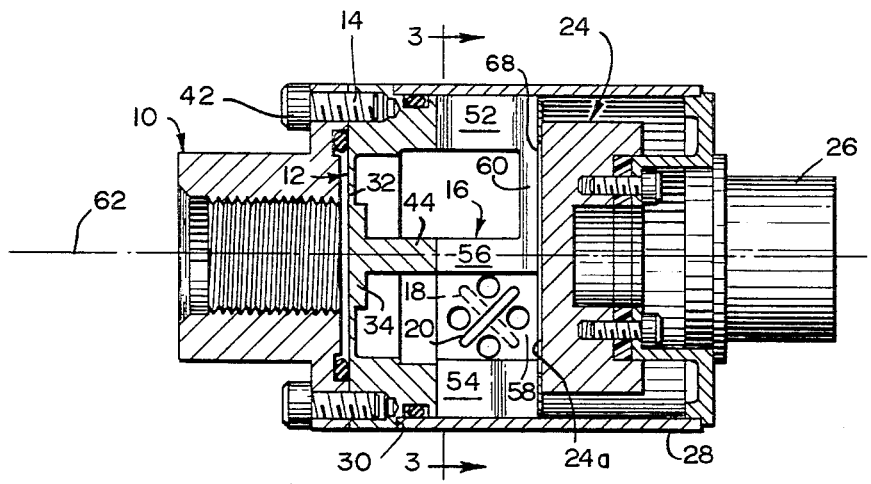
FIGURE 2 is a side cross-sectional view of the assembled transducer of FIGURE 1.

More particularly, referring to FIGURES 1 and 2, the pressure transducer has a diaphragm 12 that receives the fluid whose pressure is being measured through a fluid coupling 10. The pressure on the diaphragm produces shear stress in a blade 16 secured to a collar 14 that supports the diaphragm. Strain gages 18 and 20 bonded to the blade produce electrical signals corresponding to the pressure on the diaphragm 12. Insulated wires 22 (FIGURE 1) carry the signals past a stop block 24, attached to the collar, to an electrical connector 26. The connector is mounted on a cover 28 that fits on the collar 14 against a shoulder 30 and is conveniently welded in place.

As further shown in FIGURES 1 and 2, the diaphragm 12 has a thin annular compliant portion 32 surrounding a disk-like center portion 34. The center portion is materially thicker and stiffer than the compliant portion.

The outer edge of the compliant portion 32 joins the end of the cylindrical collar 14. Diametrically opposed slots 48 and 50 (FIGURE 1) extend through the collar wall, and threaded holes 40 in the collar receive screws 42—42 that fasten the fluid coupling 10 to it.

A solid cylindrical rod 44 extends from the center of the diaphragm center portion 34 coaxial and coextensive with the collar 14. A slot 46 bifurcates the rod 44 in line with the collar slots 48 and 50.

The diaphragm 12, collar 14 and the rod 44 are preferably machined from a single piece of stainless steel so as to be integral with each other.

The blade 16 is a thin, generally rectangular member conveniently machined from stainless steel sheet stock. It has end mounting tabs 52 and 54 secured within the collar slots 48 and 50 and a central mounting tab 56 secured within the rod slot 46.

Figure 3:
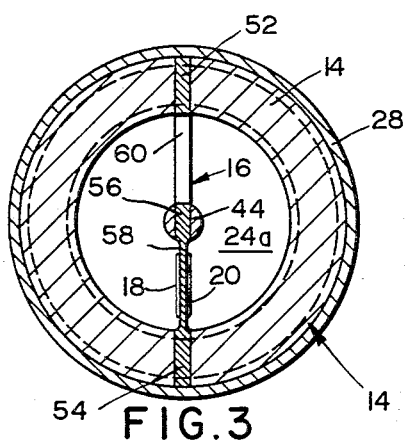
FIGURE 3 is a transverse sectional view of the transducer of FIGURE 1 taken at the section 3—3 designated in FIGURE 2.

As also shown in FIGURES 1 and 2, the blade 16 has a shear section 58 between the end tab 54 and the central tab 56. The shear section is considerably thinner than the rest of the blade 16 and its thickness dimension is symmetrical with a diameter of the collar 14, as seen in FIGURE 3. The blade 16 has only a relatively narrow beam 60 bridged between the central tab 56 and the end tab 52. The beam 60 is along the side of the blade farthest removed from the diaphragm 12.

The cover 28 can seal the interior of the transducer from the environment with a selected pressure therein. The transducer will then measure the fluid pressure in the coupling 10 relative to this known selected pressure. Alternatively, the cover 28 can have a vent hole through it, in which case the unknown pressure on the diaphragm 12 is measured relative to the atmospheric pressure of the transducer environment.

When the fluid applied to the coupling 10 exerts a pressure on the diaphragm 12 greater than the pressure inside the collar 14, i.e., greater than the pressure acting on the diaphragm side facing the blade 16, the diaphragm deflects inward, i.e. to the right along the axis 62 in FIGURE 2 and toward the stop block 24. It bends principally in the complaint portion 32. This deflection, which is very small, causes the rod 44 to exert an inward axial force on the center of the blade 16, i.e. along the tab 56. The collar 14 exerts an opposite reaction force on the ends of the blade. These forces subject the shear section 58 of the blade to shear parallel to the axis 62; the shear planes are transverse to the plane of FIGURE 2 and parallel to the axis 62.

This shear produces tension and compression stresses in the shear section 58 directed at right angles to each other and at 45° relative to the direction of the shear, i.e. to the axis 62. The strain gages 18 and 20 are bonded to the shear section oriented along these directions and hence are subjected to the maximum tension and compression strains produced by the unknown pressure. Specifically, a pressure that deflects the diaphragm 12 inward places the gage 18 in compression and the gage 20 in tension.

Where desired, the sensitivity of the transducer can be increased—although with an increase in its deflection—by drilling four holes 64—64 through the shear section 58 generally equally spaced from the intersection of the crossed strain gages and centered roughly on the bisectors of the included angles between the gages. These holes reduce the shear strength of the section 58 so that the strains along the beam areas to which the gages are bonded are increased for a given pressure load on the diaphragm.

The shear the load exerts on the blade tends to deflect the blade along the plane of FIGURE 2, i.e. along the axis 62. This deflection due to shear tends to displace the tab 56 of the blade along the axis 62 with respect to the end tabs 52 and 54; it is this deflection that strains the gages 18 and 20 to produce electrical signals measuring the load.

In addition, however, as the shear section 58 undergoes shear deformation and the tab 56 deflects to the right in FIGURE 2, the shear section deforms due to the bending moment associated with the finite length of the shear section of the blade 16. This tends to rotate the tab 56 in the plane of FIGURE 2, i.e. about an axis perpendicular to the plane of FIGURE 2. This rotation draws the axial end of the tab 56 furthest from the diaphragm laterally, toward the end tab 54. Thus, this end of the tab 56 tends to deflect downward in FIGURE 2, and the tab becomes skewed with respect to the axis 62. This mode of deflection is undesirable, and the present transducer effectively precludes it with only a minimal decrease in sensitivity.

More specifically, with further reference to FIGURES 1-3, in the event that deflection of the blade shear section 58 were allowed to move the tab 56 from being parallel to the axis 62, the rod 44 would couple this deflection to the diaphragm. The resultant bending in the diaphragm would be nonuniform and the diaphragm would become distorted. In this condition, the diaphragm would resist deflection considerably more than it does when the deflection of the tab 56 and rod 44 is only along the axis 62. As a result, the shear section would receive a materially smaller portion of the pressure load on the diaphragm, thereby decreasing sensitivity. Further, the diaphragm resistance to deflection would generally be nonlinear, so that the transducer linearity would deteriorate.

Moreover, the diaphragm modulus of elasticity, and hence its resistance to deflection, change with its temperature. Hence, if the diaphragm became distorted in the above manner, the shear stress which a pressure load exerts on the shear section of the blade would vary with the diaphragm temperature. This would result in the transducer being fairly temperature sensitive.

As mentioned above, the present transducer is essentially free of this inferior operation. This is due in large part to the beam 60 of the blade. The beam has considerable tensile and compression strength. It thereby constrains the end of the blade tab 56 joined to it from lateral movement in the plane of the blade. Hence, the beam 60 constrains the shear section to bend substantially only in a manner that translates the tab 56 along the axis 62; it prevents bending that skews the tab relative to the axis. The beam 60 thereby essentially precludes the diaphragm from being subjected to nonuniformly-distributed distorting stresses, as well as precluding the rod from being subjected to bending and twisting stresses. Further, it reduces by one-half the bending moment on the juncture of collar 14 and tab 54.

By thus minimizing these undesirable stresses, the beam 60 enhances both the high sensitivity and the low deflection of the transducer. It also improves its accuracy, linearity and temperature-stability, and enables the transducer to use a thinner collar than would be necessary without the beam.

However, the beam 60 has relatively little resistance to shear; that is, it is relatively complaint with regard to shear deformation. It also has little resistance to bending. Hence, it absorbs a fairly negligible portion of the shear produced by the load on the diaphragm. The beam thus makes possible a transducer having a single shear section, which is a highly sensitive and compact structure, and also having the rigidity and balanced symmetrically-distributed forces so efficiently produced by the lateral mounting in the support collar.

The beam 60 can be made separate from the shear section 58. Also, the transducer can have several beams 60; for example, two additional beams can be provided along the collar diameter at right angles to the diameter along which the illustrated beam 60 and shear section 58 are disposed. In another arrangement, a second beam (not shown) can be provided parallel to and axially spaced from the illustrated beam 60.

With further reference to FIGURES 1 through 3, the rigidty of the tubular collar 14 prevents the end tabs 52 and 54 on the blade 16 from being offset from each other along the axies 62. This precludes transverse deflection or bending of the shear section 58 except when the diaphragm is subjected to a load. The collar also constrains the end tabs to be coplanar with each other and parallel to the axis 62. These static constraints restrict the blade from spurious deformation; that is, from deflection other than that which results from the vertical shear due to the load.

As a result of these constraints which the collar 14 and the beam 60 impose on the shear section 58, the section requires only a minimum of resistance to forces other than the vertical shear imposed therein by the load. This is highly desirable because the additional structure that would otherwise be required in the shear section to resist nonshear forces generally bypasses a material portion of the shear from the shear section beam areas to which the strain gages are bonded. By thus freeing the shear section of the requirement for such additional structure, the coaxial support makes it possible for essentially all the energy the load imparts to the transducer to produce shear in the gaged shear section beams. This contributes materially to the attainment of high sensitivity in a low-deflection structure.

The tabular support for the blade also diminishes thermal problems that would degrade the operation of the transducer. This is because the structure of the transducer maintains the blade at essentially the same temperature throughout and very nearly equal to the diaphragm and collar temperatures even when the latter temperatures change rapidly due, for example, to a temperature change in the fluid acting on the diaphragm. First, the collar has a relatively high thermal mass and is hence a fairly good heat sink. In addition, the collar and the rod 44 have relatively high thermal conductivity and hence conduct heat between the blade and the diaphragm and collar fairly rapidly.

Moreover, because the blade is supported at its lateral edges rather than along the bottom edge, i.e. along the edge adjacent the stop block 24, essentially the only thermal gradients that can develop in it are directed between the end tabs, that is, along its lateral dimension. These gradients, however, affect both strain gages in the same manner and hence cause essentially no unbalance between the signals from the two gages.

Similarly, when the temperature of the fluid acting on the diaphragm changes so that the temperatures of the diaphragm and the collar differ from the temperature of the blade, the diameter of the collar will change, placing a lateral stress in the blade. Nevertheless, each strain gage is subjected to only one-half of this stress, and the two gages are stressed by equal amounts. Thus, whatever small lateral stresses do develop have little or no effect on the net electrical signal from the transducer.

The fact that the diaphragm absorbs little energy from the load also keeps the transducer operation relatively invariant for different operating temperatures. This is because, as noted above, the modulus of elasticity of the diaphragm material changes with temperature, with the result that the amount of energy the diaphragm absorbs for a given load changes with temperature. However, by utilizing a relatively compliant diaphragm that absorbs relatively little energy from the load, the present transducer exhibits little of this temperature-dependent error found in prior transducers.

With further reference to FIGURES 1 and 2, in order to prevent excessive deflection of the diaphragm 12 and transverse bending of the blade 16 as would be caused by an overload on the diaphragm, the stop block 24 has a flat surface 24a closely spaced along the axis 62 from the blade 16. This spacing is readily set by means of an annular spacer 68 interposed between the inner face of the housing collar and the stop block. As shown in FIGURE 1, machine screws 70 threaded into the housing collar secure the stop block and the spacer to the housing. With this arrangement, when the diaphragm is deflected to the desired maximum limit, the rod 44 bottoms against the surface 24a.

It should also be noted that the blade 16, the collar 14 with the integral diaphragm 12 and rod 44, and the stop block 24 are readily assembled to form a highly compact, solidly rigid unitary structure. On the other hand, these fairly critical components of the transducer can be fabricated separately from the other components with relatively straightforward machining. This enhances the economy of the transducer. It also enables the material of each component to be selected and treated independent from that of the other components for optimum economy and performance.

One reason it is important for this assemblage to be compact is to minimize strain and temperature elongations that would detract from precise operation. For example, the present transducer structure has a very short member, i.e. the collar 14, securely fixing the plane of the diaphragm relative to the blade. It is obvious that whatever axial elongation takes place in the collar between the diaphragm and the blade introduces an error into the transducer output signal.

The compactness and rigidity of the transducer also prevents mechanical resonances except at frequencies higher than those encountered in even the more stringent operating environments.

Furthermore, with the present construction, the blade shear section can be accurately and precisely machined to have a highly uniform and small thickness. This is important for high sensitivity and accuracy.

Figure 4:
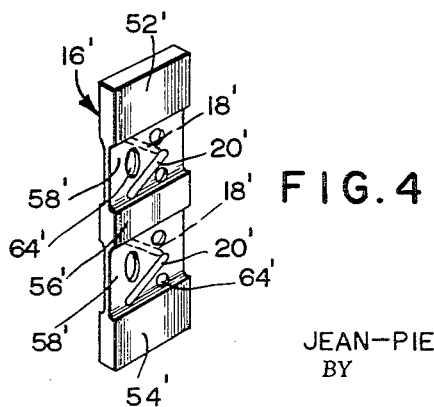
FIGURE 4 is a perspective view of a shear element for use in the transducer of FIGURE 1 in place of the shear element shown in that figure.

FIGURE 4 shows an alternative construction for the blade 16 wherein there are two identical shear sections 58'—58'. The double shear section blade 16' has end tabs 52' and 54' and a central tab 56' identical to those of the blade 16 of FIGURES 1 through 3. The shear sections 58'—58' have the same thickness. Further, as in the blade 16, they are centered on the plane of the blade.

The provision of a second shear section increases the shear strength of the blade 16', enabling the transducer to accommodate larger loads. It also distributes stresses in the diaphragm-collar-blade structure even more symmetrically than does the blade 16 having a single shear section.

However, with the double shear section of FIGURE 4, the transducer has roughly one-half the sensitivity that it has with the single shear section. Thus the transducer with two shear sections requires a diaphragm having roughly twice the area as the diaphragm for the single-section transducer in order for the two transducers to produce the same electrical output signals for a given input pressure.

The blade 16' of FIGURE 4 illustrates a further variation whereby the strain gages 18' and 20' on each shear section are arranged in a V rather than in an X as in FIGURES 1 and 2. The strain-concentrating apertures 64' are then arranged in a triangular pattern, rather than in the square pattern shown in FIGURES 1 and 2.

Figure 5:
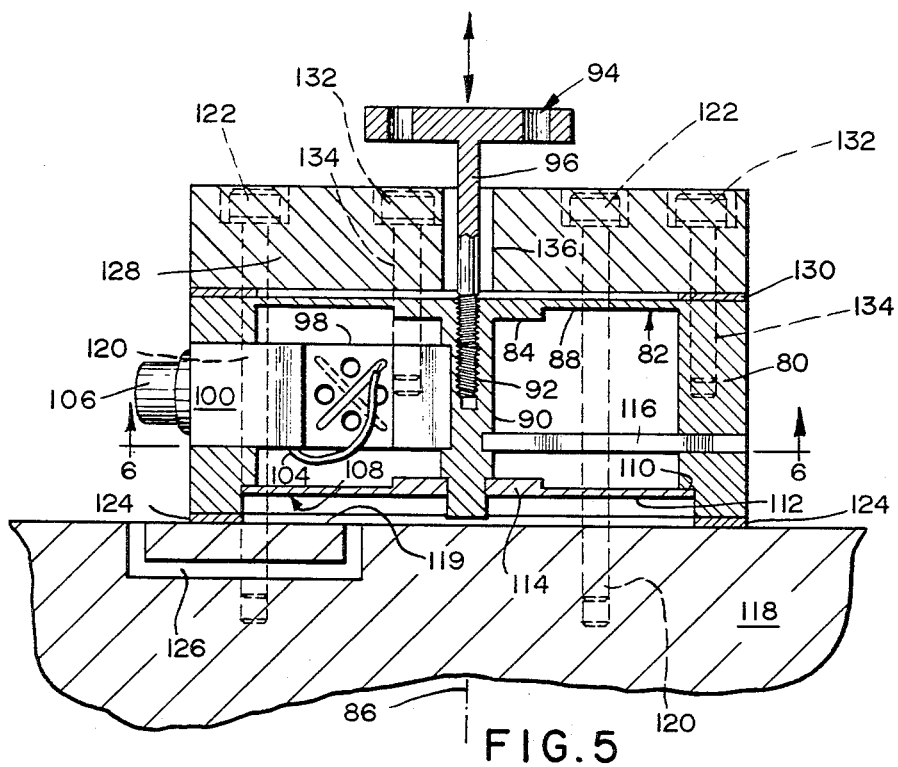
FIGURE 5 is a side cross-sectional view of a load cell embodying the invention.
Figure 6:
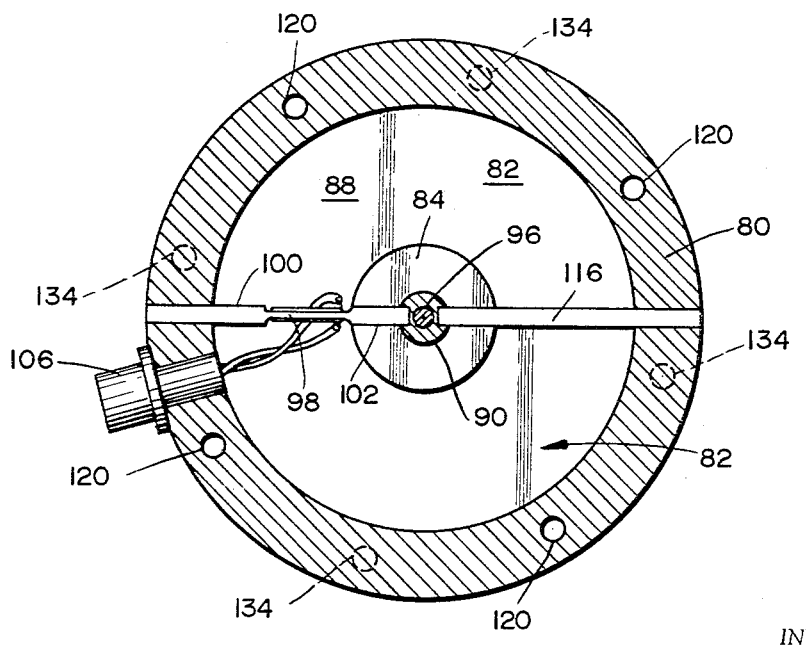
FIGURE 6 is a transverse sectional view of the load cell of FIGURE 5 taken along the section 6—6.

FIGURES 5 and 6 show a load cell having essentially the same blade and collar construction as the pressure transducer of FIGURES 1 through 3. However the load cell has a balancing diaphragm sealing the end of the collar remote from the diaphragm that receives the fluid pressure in the pressure transducer.

The sealed load cell is insensitive to its environmental pressure and hence can measure either compression or tension forces at any altitude and in vacuum chambers without having to correct the electrical output signals according to the environmental pressure. As indicated in FIGURE 5, the load is applied along thte central axis of the load cell.

More particularly, the load cell has a cylindrical support collar 80 spanned at its upper end by an integral diaphragm 82. The diaphragm has a disk-like central portion 84 concentric with the collar axis 86 and radially within a compliant portion 88.

A force-transferring rod 90 extends from the center of the diaphragm 82 coaxial with the collar 80. A threaded hole 92 concentric with the axis 86 extends through the diaphragm center portion 84 and into the rod 80. A load-receiving member 94 has a threaded shaft 96 that screws into the hole 92 to apply the load to the diaphragm 82 and the rod 90.

A shear section 98 has end tabs 100 and 102 brazed in slots in the collar 80 and the rod 90, respectively. The shear section and its tabs are suitably identical to the shear section 58 and tabs 54 and 56 of FIGURES 1 through 3. However, as shown in FIGURE 5, the shear section 98 is spaced a considerable distance from both ends of the collar 80.

Strain gages are bonded to the shear section 98 oriented at 45° to the axis 86 and connect to leads 104 that pass through the collar wall to a connector 106, FIGURE 6. The passage of the leads 104 to the outside of the collar is pressure tight.

As also shown in FIGURES 5 and 6, the load cell has a sealing diaphragm 108 secured at its outer periphery to a recessed annular surface 110 at the lower end of of the collar 80. The sealing diaphragm is preferably identical to the diaphragm 88, with a compliant outer portion 112 and a relatively stiff central portion 114. However, the rod 90 protrudes through the central portion of the sealing diaphragm; the diaphragm and rod are joined together at this juncture as by welding. The sealing diaphragm 108 thus hermetically seals the cavity within the collar 80, which contains the shear section 98 and the strain gages, from the environment.

The load cell can also have a beam 116 in line with the shear section 98 along a diameter of the collar and secured at opposite ends to the rod 90 and the collar 80. The beam 116 thus corresponds to the beam 70 in FIGURES 1 through 3. However, due to the radial strength of the sealing diaphragm 108, the beam 116 can often be omitted from the load cell.

When the two diaphragms 82 and 108 are exposed to the same environment, they exert equal and opposite forces on the rod 90 according to the difference between the environmental pressure and the pressure inside the transducer. For example, when the environmental pressure is larger than the pressure within the transducer, the rod 90 will be in compression. However, since the net forces on the two diaphrams are equal and opposite, the rod is not displaced relative to the collar 80 and no shear is exerted on the shear section 98. The shear section is placed in shear only when a load is exerted on the member 94.

As shown in FIGURE 5, the load cell is supported on a test stand 118 whose upper surface 119 is machined flat and is provided with threaded holes 120 that receive bolts 122 for securing the load cell to it. An annular spacer 124 is sandwiched between the collar 80 and the test stand surface to space the protruding end of the rod 90 from the surface 119 by the maximum deflection desired for the load cell under a compression (downward in FIGURE 5) load. The test stand surface 119 thus serves as a stop block for the load cell.

As also shown in FIGURE 5, an air passage 126 extends through the test stand between the environmental atmosphere of the load cell and the space directly below the sealing diaphragm 108. This ensures that the sealing diaphragm will receive the environmental pressure, which also acts on the upper diaphragm 82.

The load cell also has a stop block 128 spaced above the diaphragm 82 by an annular spacer 130. Bolts 132 threaded into holes 134 in the collar 80 secure the block 128 and spacer in place. The mounting bolts 122 that secure the load cell to the test stand pass through the stop block as well as the collar 80, as shown. The stop block is suitably cylindrical and has a central bore 136 through which the shaft 96 of the load receiving member freely passes. The diameter of the bore is preferably no larger than roughly the diameter of the rod 90 so that when an excessive tension load is applied, the stop block engages the diaphragm 82 opposite the rod 90.

The radial strength and axial compliance of the diaphragms 82 and 108, as well as of the beam 116 when used, enable the load cell to operate with both high sensitivity and minute deflection, as provided with the pressure transducers of FIGURES 1 through 3. The load cell exhibits the other features of the pressure transducer, such as high linearity, low temperature sensitivity, economic manufacture, small size and high resonant frequency. Also, a high, essentially invariant portion of the input energy from a load is converted to shear in the gaged areas of the shear section.

In summary, a tubular member supporting the lateral edges of the shear element of a shear strain force transducer as described above provides multiple advantages in sensitivity, deflection, accuracy, linearity and temperature stability without requiring costly manufacturing techniques. The transducer also has small size relative to the output signal and a high natural frequency.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to be secured by Letters Patent is:

1. A force-measuring device comprising
   A. a relatively rigid tubular member,
   B. a relatively rigid rod member
      (1) having a longitudinal axis,
      (2) disposed coaxially within said tubular member, and
      (3) adapted to receive a force to be measured directed along said axis,
   C. support means
      (1) joined between said rod member and said tubular member, and
      (2) constraining the connection thereof with said rod member from radial movement relative to said tubular member, D. a thin plate-like shear section laterally connected between said rod member and a first portion of said tubular member and extending generally parallel to said longitudinal axis so that relative axial movement between said members produces substantially only shear in said section, E. means laterally connected between said rod member and a second portion of said tubular member opposite said first portion to restrain movement of said rod member transverse to said axis, and F. means sensing the shear produced in said section from said relative axial movement of said members.

2. A force-measuring device according to claim 1 wherein said support means is a diaphragm spanning said tubular member and imparting axial force to said rod member corresponding to the axial force on the diaphragm whereby the rod member receives said force to be measured from the axial force on the diaphragm.

3. A force-measuring device according to claim 1 wherein said support means
A. connects to said rod member adjacent the axial position at which said rod member receives said force to be measured and
B. exerts relatively little axial constraint on said rod member when said rod member is in a selected neutral axial position.

4. A force-measuring device according to claim 1 further comprising stop means
A. joined to said tubular member and bridged thereacross closely axially spaced from said rod member, and
B. limiting relative axial movement of said rod member in at least a first direction.

5. A force-measuring device according to claim 1 wherein
A. said tubular member has first and second locations axially spaced apart on either side of said shear section,
B. said support means comprises a diaphragm spanning said tubular member at said first location, and
C. a second diaphragm spans said tubular member and connects to sad rod member at said second location.

6. A force-measuring device according to claim 1 wherein said shear section comprises a relatively thin, planar sheet having a width dimension oriented parallel to said axis and having a lateral dimension oriented parallel to the radial spacing between said rod and tubular members, said shear section sheet being secured at its respective lateral ends to said members.

7. A force-measuring device according to claim 6 wherein the means restraining transverse movement of said rod member comprises an elongated structural element connected between said rod and tubular members substantially radially opposite said shear section sheet, said element being substantially compliant along said axis and constraining its connection to said rod member from radial movement that would elongate said element.

8. A force-measuring device according to claim 1 wherein
A. said tubular member has a right circular cylindrical inner surface facing and coaxial with said rod member, and
B. said shear section and the means restraining transverse motion of said rod are aligned along a diameter of said cylindrical surface substantially transverse to a longitudinal axis thereof.

9. A force-measuring device according to claim 1 wherein the means restraining transverse movement of said rod member is relatively compliant in said axial direction and has relatively high tensile strength along the radius of said tubular member.

10. A force-measuring device according to claim 1 wherein said shear section and the means restraining transverse movement of said rod member connect to said rod member within axially-overlapping, axially-extending regions therealong.

11. A force-measuring device comprising
A. a tiny shear element
(1) having first and second ends laterally spaced apart, and
(2) subjected to vertical shear by opposite forces exerted along said ends parallel to a first axis,
B. a central support member
(1) extending along said first axis,
(2) joined to said first end of said shear element to transfer axial force exerted thereon to said shear element,
C. a tubular wall surrounding said central support member,
D. means forming first and second columnar support members connected to, and extending inwardly from, said tubular wall, said columnar support members extending parallel to said first axis on either side of said central member and being at least partially coextensive with it, said first columnar member being joined to the second end of said shear element to transfer axial forces exerted thereon to said shear element,
E. beam means joined between said central member and said second columnar member,
F. said beam means and said shear element constraining their connections to said central member from movement relative to said columnar members and transverse to said axis,
G. means forming an axially deflectable crosspiece
(1) spanned across said tubular wall and connected to said central member,
(2) spaced along said axis from said shear element and from said beam means, and
(3) constraining its connection with said central member from movement relative to said columnar members and transverse to said axis,
H. said columnar members and said crosspiece and said shear and beam elements forming, in a substantially planar section parallel to said axis, a substantially rectangular structure wherein said columnar members are in a first pair of opposite sides, and
I. said central member crosses said rectangular structure between the other two sides thereof.

12. A force-measuring device according to claim 11 wherein said shear element is secured to said central member and said first member at juncture regions extending along said first axis for substantially its entire dimension parallel to said first axis.

13. A force-measuring device according to claim 11 wherein said crosspiece and said beam means are comparatively compliant with regard to deflection along said axis.

14. A shear strain force transducer comprising
A. a cylindrical housing collar having a first end, and a second location axially spaced from said end,
B. a diaphragm integral with and spanning said collar at said first end,
C. a rod joined to the center of said diaphragm and extending coaxially within said collar to at least opposite said second location,
D. a first planar shear element having a small thickness dimension transverse to both a collar radius and the collar axis and laterally connected between said collar and said rod along a radius of said collar adjacent said second location, said shear element being secured to said collar and to said rod along substantially its entire axial dimension at its junctures therewith in the direction of the axis of said collar, and E. means on said shear element responsive to shear strain therein parallel to said axis.

15. A force-measuring device according to claim 14 wherein
A. said shear element has a relatively high resistance to shear parallel to said axis, and
B. a beam element is bridged between said collar and said rod substantially in-line with said shear element, said beam element having relatively little resistance to said shear and having a relatively high tensile strength along the radius of said collar.

16. A force transducer according to claim 14 in which a further thin planar shear element substantially identical to said first shear element is bridged between said collar and said rod along a radius substantially opposite said first shear element.

17. A shear strain force transducer comprising
A. a tubular housing collar having a central axis and first, second and third locations successively axially spaced from each other therealong,
B. a first diaphragm spanning said collar at said first location and sealed along its periphery to said collar,
C. a second diaphragm spanning said collar at said third location and sealed along its periphery to said collar,
D. a rod axially extending between and joined to the centers of said diaphragms,
E. a planar shear element having a relatively small thickness dimension transverse to both the collar axis and thickness, and bridged laterally between said collar and said rod and oriented transverse to said shear axis, said shear element being secured to said rod and said collar along substantially its entire lateral dimensions at its respective junctures therewith and in the direction of the axis of said collar, and
F. means on said shear blade responsive to shear strain therein parallel to said axis.

18. A shear strain force transducer according to claim 17 wherein
A. load transferring means are secured to said rod through said first diaphragm along said collar axis,
B. said collar and diaphragms form a cavity sealed from the environment outside the transducer and the sides of both said diaphragms outside said cavity are exposed to the same pressure, and
C. first stop means secured to said collar limit the movement of said rod in a first direction along said collar axis.

19. A shear strain force transducer according to claim 17 wherein
A. said collar and said diaphragm form a cavity sealed from the environment outside the transducer, and
B. said diaphragms exert substantially equal and opposite forces on said rod when exposed to the same environmental pressure.

References Cited

UNITED STATES PATENTS

| | | | |
|---|---|---|---|
| 2,597,751 | 5/1952 | Ruge | 73—88.5 XR |
| 3,037,178 | 5/1962 | Pien | 73—88.5 XR |
| 3,180,139 | 4/1965 | Soderholm | 73—141 |
| 3,195,353 | 7/1965 | Pien | 73—398 |
| 3,196,676 | 7/1965 | Pien | 73—141 |
| 3,272,006 | 9/1966 | Eckard | 73—141 |
| 3,320,569 | 5/1967 | Jones | 338—5 |

RICHARD C. QUEISSER, *Primary Examiner.*

C. A. RUEHL, *Assistant Examiner.*

UNITED STATES PATENT OFFICE
CERTIFICATE OF CORRECTION

Patent No. 3,413,845

December 3, 1968

Jean-Pierre A. Pugnaire

It is certified that error appears in the above identified patent and that said Letters Patent are hereby corrected as shown below:

Column 5, line 28, "axies" should read -- axis --; line 51, "tabular" should read -- tubular --. Column 6, line 33, "compace" should read -- compact --; line 51, "prevents" should read -- prevent --. Column 9, line 45, "sad" should read -- said --. Column 10, line 9, "tiny" should read -- thin --. Column 12, line 18, "diaphragm" should read -- diaphragms --.

Signed and sealed this 1st day of September 1970.

(SEAL)
Attest:

Edward M. Fletcher, Jr.

Attesting Officer

WILLIAM E. SCHUYLER, JR.

Commissioner of Patents